United States Patent Office.

WILLIAM BATTY, OF PHILADELPHIA, PENNSYLVANIA, ASSIGNOR OF ONE-HALF TO GEORGE H. PERKINS, OF SAME PLACE.

FIRE-BRICK.

SPECIFICATION forming part of Letters Patent No. 270,175, dated January 2, 1883.

Application filed July 29, 1882. (No specimens.)

*To all whom it may concern:*

Be it known that I, WILLIAM BATTY, of Philadelphia, Pennsylvania, have invented a new article of manufacture—viz., Fire-Brick Composed of Fire-Clay, Kaolin, and Calcined Oil-Coke—as hereinafter described and claimed.

To carry out my invention, I introduce a suitable quantity of oil-coke into a muffle or other suitable calcining-furnace, and I therein subject said oil-coke to the action of heat for such time as is necessary to drive off bituminous matters and leave the oil-coke charcoal in a dry condition.

The charcoal produced as above described is crushed or otherwise finely divided and is mixed with fire-clay and kaolin in the proportions of about twenty per cent. (20 %) fire-clay, ten per cent. (10 %) kaolin, and seventy per cent. (70 %) oil-coke charcoal. This mass is moistened and mixed and then pressed into molds of suitable form for the manufacture of bricks. These bricks are baked in the usual way and form an article especially adapted for use in withstanding high temperatures, as in furnaces, kilns, and the like.

I do not confine myself to the exact proportions herein given, as the same may to some extent be departed from without changing the nature of my invention.

Having thus described my invention, I claim—

A new article of manufacture—a fire-brick consisting of fire-clay, kaolin, and calcined oil-coke—substantially as specified.

In testimony whereof I have hereunto signed my name this 14th day of July, A. D. 1882.

WILLIAM BATTY.

In presence of—
W. C. STRAWBRIDGE,
J. BONSALL TAYLOR.